United States Patent [19]

Itin et al.

[11] 4,042,087
[45] Aug. 16, 1977

[54] CLUTCH CONTROL DEVICE FOR A MACHINE TOOL

[76] Inventors: Artur Markovich Itin, Rostovskaya naberezhnaya, 1, kv. 47; Vladimir Fedorovich Eremin, Chertanovskaya ulitsa, 66, kv. 24, both of Moscow, U.S.S.R.

[21] Appl. No.: 634,467

[22] Filed: Nov. 24, 1975

[51] Int. Cl.² .......................................... F16D 19/00
[52] U.S. Cl. .................................. 192/99 S; 74/96; 74/436
[58] Field of Search ............... 192/82 R, 93 R, 99 S; 74/508, 96, 436

[56] References Cited

U.S. PATENT DOCUMENTS

| 1,642,120 | 9/1927 | Mathews | 74/508 X |
| 2,297,389 | 9/1942 | Brandholt | 74/508 X |

FOREIGN PATENT DOCUMENTS

| 909,401 | 12/1945 | France | 192/93 R |
| 589,258 | 6/1947 | United Kingdom | 192/82 R |
| 1,037,370 | 7/1966 | United Kingdom | 192/99 S |

*Primary Examiner*—Benjamin W. Wyche

[57] ABSTRACT

A device comprising horizontal and vertical shafts wherein the horizontal one is connected to a handle while the vertical shaft is operatively connected to a movable member of the clutch. Geometrical axes of said shafts are lying in a common plane, whereas shafts for transmitting rotation from the horizontal shaft to the vertical one are interconnected through a Geneva mechanism with a driving member of said mechanism being fixed to the horizontal shaft while a driven member thereof is fixed to the vertical shaft. It is possible with such an arrangement of the device to reduce the force applied by an operator of the machine tool to the clutch control handle.

2 Claims, 3 Drawing Figures

CLUTCH CONTROL DEVICE FOR A MACHINE TOOL

This invention relates to the field of machine-tool manufacture and more particularly to clutch control devices for machine tools.

The device according to the invention may be used most advantageously for controlling operations of a friction clutch in the main drive of a lathe.

Widely known in the art are devices for controlling clutches in lathes comprising a horizontal shaft and a vertical one with concurrent geometrical axes. A handle is mounted on the horizontal shaft for its rotation, while the vertical shaft is kinematically connected to a movable member of the clutch. This kinematic chain consists of a pinion fixed to the end of the vertical shaft and of a rack engaging with the pinion and connected via a dog to the movable member of the clutch.

The vertical shaft and the horizontal shaft are interconnected by means of a torque transmitting mechanism. The latter consists of two cranks with one of these cranks being fixed vertically to the horizontal shaft and the other being fixed horizontally to the vertical shaft in parallel with the horizontal shaft. These cranks are interconnected by a connecting rod which rod during the rotation of the horizontal shaft transmits its movement to the crank of the vertical shaft and therefore shifts the rack in the required direction.

In the clutch control mechanism of the above-described type the torque at the initial period of the horizontal shaft rotation transmitted to the vertical shaft is rather small and its value is increased in proportion to a force applied to disks of the clutch. At the same time, crank arm projections of the horizontal shaft to the axis of the vertical shaft as well as those of the crank arm of the vertical shaft to the axis of the horizontal one are decreased which cause an operator to apply greater force to the handle.

The object of the present invention is to provide a clutch control device for a machine tool wherein a mechanism transmitting a torque from the horizontal shaft to the vertical one is made so that simultaneously with a substantial increase of the torque on the vertical shaft it is possible to decrease a force applied by the operator to the handle for switching on the clutch.

According to the above and other objects, it is provided a clutch control device for a machine tool, wherein a horizontal shaft carrying a handle and a vertical shaft operatively connected to a movable clutch member are interconnected through a mechanism transmitting a torque from the horizontal shaft to the vertical one, and wherein, according to the invention, the axis of the horizontal shaft and that of the vertical one are lying in a common plane, whereas the torque transmitting mechanism comprises a Geneva mechanism with a driving member of said mechanism being fixed to the horizontal shaft and a driven member thereof being fixed to the vertical shaft.

It is expedient to make a through opening in the horizontal shaft which is normal to its axis and adapted to pass the vertical shaft therethrough a spherical sliding bearing being mounted in said opening so that an outer ring of the bearing is fixed to the horizontal shaft and the inner ring is fixed to the vertical shaft.

The mounting of the vertical shaft in the spherical sliding bearing which in turn is mounted in the horizontal shaft makes it possible to provide an additional support for the horizontal shaft.

It is also advisable to make the driving member of the Geneva mechanism in the form of a barrel-like roller mounted in a bracket fixed to the horizontal shaft, whereas the driven member comprises a bracket attached to the vertical shaft and provided with a slot accommodating said roller.

Such an arrangement of the Geneva mechanism simplifies the structure of the device and minimize friction losses.

It is advisable to mount the roller in the bracket so that an angle equal substantially to 45° is defined between the geometrical axis of the roller and that of the horizontal shaft.

This ensures that the roller contacts the side walls of the slot with minimum slipping.

A clutch control device for a machine tool according to the invention makes it possible to apply, for switching on the clutch, relatively small forces to the control handle which reduce the fatigue of the operator.

Furthermore, the device of the present invention is simple in structure and reliable in operation.

The above objects and advantages of the invention will be best understood from the following description of a specific embodiment thereof when read in connection with the accompanying drawings, wherein.

Figure 1:
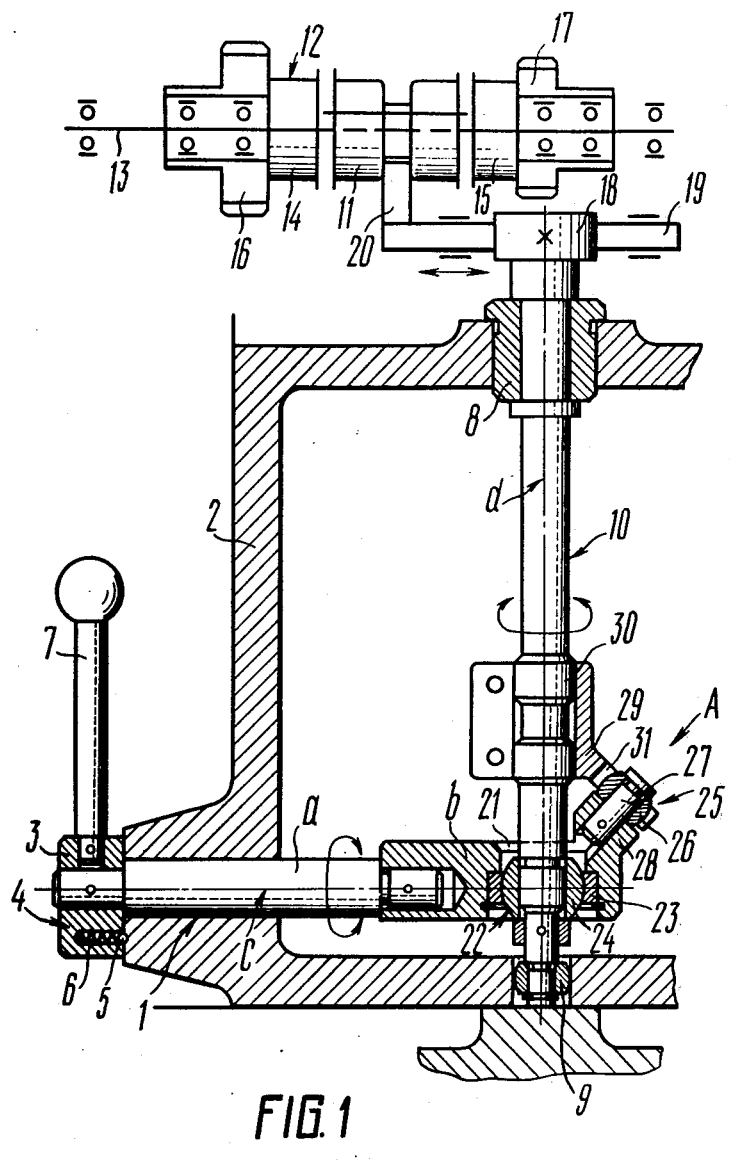
FIG. 1 is a longitudinal sectional view of a clutch control device made in accordance with the present invention.

A clutch control device for a machine tool comprises a horizontal shaft 1 (FIG. 1) mounted in a machine tool bed 2. The shaft 1 consists of two rigidly interconnected parts $a$ and $b$. A bush 3 is fixed to one end of the shaft, said bush mounting a stop consisting of a ball 5 and a spring 6. A handle 7 is fixed in the bush 3.

A vertical shaft 10 is mounted in bearings 8 and 9 in the bed 2. This vertical shaft is operatively connected to a movable member 11 of a clutch 12. The movable member 11 can be shifted in the longitudinal direction of a driving shaft 13.

The clutch 12 consists of two parts 14 and 15 mounted on a driving shaft 13 at opposite sides of the movable member 11.

The parts 14 and 15 of the clutch are connected respectively to tooth gears 16 and 17 to impart direct and reverse rotational movements to an actuating member (not shown in the drawing).

The kinematic chain between the vertical shaft 10 and the clutch 12 consists of a tooth gear 18 fixed to the end of the vertical shaft 10 and being in constant mesh with a rack 19 connected through a dog 20 to the movable member 11 of the clutch 12.

Geometrical axes $e$ and $d$ of the shafts 1 and 10 respectively are lying in a common plane.

Figure 2:
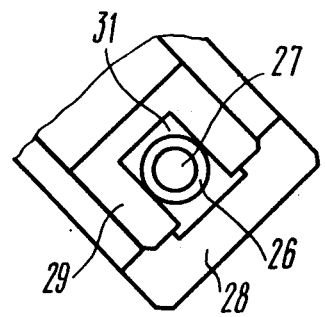
FIG. 2 is a view in direction of arrow A in FIG. 1.

A through opending 21 for passing the vertical shaft 10 is provided in part $b$ of the horizontal shaft 1. A spherical sliding bearing 22 is accommodated in this opening, an outer ring 23 of the bearing being fixed in portion $b$ of the shaft 1, whereas an inner ring 24 is fixed to a vertical shaft 10. The bearing 22 functions as a support for the horizontal shaft 1. A three-dimentional Geneva mechanism which is also known as a 3D spherical Geneva mechanism drivingly interconnects the shafts and is used to transmit torque from the horizontal shaft 1 to the vertical one 10. A driving member of this mechanism is made as a barrel-shaped roller 26 mounted on an axle 27 rigidly fixed to a bracket 28. In the embodiment illustrated the bracket 28 is a portion of part $b$ of the shaft 1. A driven member of the Geneva mechanism comprises a bracket 29 splined at 30 to the vertical shaft 10. The bracket 29 is made in the form of a bolt-tightened yoke. A slot 31 (FIGS. 1,2) is provided in the bracket 29 to accommodate therein a roller 26.

To ensure minimum slipping of the roller 26 during its rolling along the side wall of the slot, the roller should be mounted in the bracket so that an angle equal substantially to 45° is defined between its axle 27 and axis $c$.

The clutch control device for a machine tool operates in the following manner.

Figure 3:
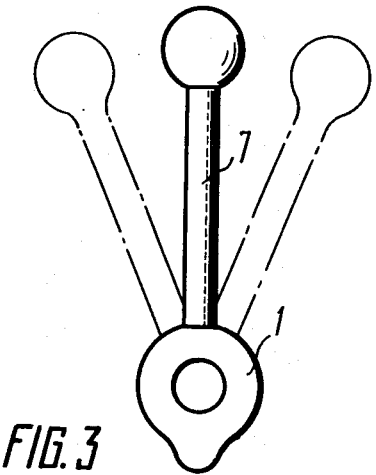
FIG. 3 is a view illustrating three operating positions of the handle.

An operator of the machine tool turns the handle 7 (FIG. 3) from the intermediate or neutral position, wherein the handle is fixed by the ball 5, to one of two extreme operating positions associated with switching on respectively one of parts 14 or 15 of the clutch for direct or reverse rotation of the actuating member. Upon rotation of the handle 7 the bush 3 turns the horizontal shaft 1 along with the bracket 28 and the roller 26 which through its engagement with the side surface of the slot 31 in the bracket turns the vertical shaft 10 and hence the tooth gear 18 fixed thereto. The rotation of the gear shifts the rack 19 which through the dog 20 moves the movable member 11 in the longitudinal direction of the shaft 13. Thus, depending on the direction of rotation of the handle 7, the movable member 11 will switch on either the part 14 or 15 of the clutch 12, thereby transmitting the torque to the tooth gear 16 or 17.

Upon shifting the handle 7 from the intermediate neutral position to one of the extreme or operating positions, the roller 26 will turn the bracket 29 and, while moving along the slot 31, it will pass from the smaller radius to the greater one, thereby increasing the length of an arm for the force to be applied. Thus, with a constant force applied to the handle 7 the torque transmitted by means of the three-dimensional Geneva mechanism 25 from the horizontal shaft 1 to the vertical shaft 10 will be increased gradually along with the length of the arm for the applied force up to its maximum value at the end of the stroke of the movable member 11, i.e. at the critical point of switching the clutch 12 which is associated with the transmission of maximum force by said movable member 11 at this moment.

The accomplishment, in the clutch control device for a machine tool, of a mechanism transmitting torque from the horizontal shaft 1 to the vertical shaft 10 in the form of the three-dimensional Geneva mechanism 25 in combination with the support for the horizontal shaft in the form of the spherical bearing 22, makes it possible to apply to the movable member 11 of the clutch 12 a force increased gradially as far as the movable member 11 approaches its extreme positions.

What is claimed is:

1. A clutch control device for a machine tool, comprising a horizontal shaft; a handle secured to said shaft; a vertical shaft; the centerlines of said vertical and horizontal shafts extending through the same plane; a 3D spherical Geneva mechanism interconnecting said two shafts; a driving member and a driven member of said Geneva mechanism secured to said horizontal and vertical shafts, respectively; said horizontal shaft having a drilled opening to accommodate the vertical shaft, said drilled opening receiving the outer race of a spherical sliding bearing, an inner race of said bearing being secured to said vertical shaft.

2. A clutch control according to claim 1, wherein said driving member of the Geneva mechanism comprises a barrel-shaped roller mounted in a bracket attached to the horizontal shaft, the driven member of said Geneva mechanism comprising a bracket fixed to the vertical shaft and having a slot to accommodate therein said roller, said roller being mounted in its bracket so that an angle equal substantially to 45° is defined between the geometrical axis of the roller and the axis of the horizontal shaft.

* * * * *